 United States Patent
Dinh et al.

(10) Patent No.: US 6,879,138 B2
(45) Date of Patent: Apr. 12, 2005

(54) BUCK CONVERTER WITH TRANSIENT SUPPRESSION

(75) Inventors: James S. Dinh, Gig Harbor, WA (US); Robert D. Wickersham, Yelm, WA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 10/273,741

(22) Filed: Oct. 18, 2002

(65) Prior Publication Data

US 2004/0076026 A1 Apr. 22, 2004

(51) Int. Cl.$^7$ ................................................ G05F 1/40
(52) U.S. Cl. ....................................... 323/284; 327/530
(58) Field of Search ............................ 363/62; 323/282, 323/283, 284, 285, 234; 327/530

(56) References Cited

U.S. PATENT DOCUMENTS 6,246,222 B1 * 6/2001 Nilles et al. ................ 323/283
6,563,294 B2 * 5/2003 Duffy et al. ................ 323/283
6,670,794 B1 * 12/2003 Wang et al. ................ 323/213
6,696,882 B1 * 2/2004 Markowski et al. ........ 327/531

* cited by examiner

Primary Examiner—Adolf Berhane
(74) Attorney, Agent, or Firm—Carrie A. Boone, P.C.

(57) ABSTRACT

A buck converter is disclosed which prevents a voltage drop below a desired voltage when a load change occurs. The buck converter generates an override signal to turn on one or more switch devices in the circuitry. The effect of the override signal is to provide a sudden increase in the current supplied to a load, preventing the output voltage from dropping below the predetermined level. Sensing circuitry within the buck converter detects a voltage drop at the load, causing the override signal to be generated. The override signal may be a continuous signal or a one-shot pulse. Additional current sensing circuitry and the switch history of the buck converter determines the duration of the override signal for one embodiment and the number of switches activated within the buck converter.

11 Claims, 11 Drawing Sheets

BUCK CONVERTER WITH TRANSIENT SUPPRESSION

FIELD OF THE INVENTION

This invention relates to switched mode power supplies and, more particularly, to a buck converter capable of automatically suppressing voltage transients.

BACKGROUND OF THE INVENTION

A buck converter is a switched mode power supply that switches a first input voltage to a second, lower output voltage. Essentially a voltage regulator, the buck converter is also known as a down switcher, a step-down converter, and a switch mode regulator. Characteristic elements in a typical buck converter include inductors, capacitors, diodes, and metal-oxide semiconductor field-effect transistors (MOSFETs) for switching operations.

When a load is applied to the output of the buck converter, the output voltage will generally drop. The drop in voltage is due to such factors as the internal resistance, internal inductance, and other characteristics of the buck converter. The drop in output voltage often has a temporary, or transient, component that is below the "steady state" voltage produced by the load.

In some circumstances, the temporary drop, or "droop," in output voltage can cause problems for the load circuitry. The voltage "droop" is typically managed by using one or more capacitors with low inductance and low equivalent series resistance (ESR), such as ceramic capacitors. For high performance power supplies, several of these specially featured capacitors may be necessary. Such capacitors, however, are both costly and bulky.

Thus, a need exists for a buck converter that addresses the shortcomings of the prior art.

DETAILED DESCRIPTION

In accordance with the embodiments described herein, a buck converter is disclosed in which a carefully timed override signal is produced to turn on one or more switch devices in the circuitry. The effect of the override signal is to provide a sudden increase in the current supplied to a load, preventing the output voltage from dropping below a predetermined level. The buck converter includes sensing circuitry to detect a voltage drop at the load. The voltage drop activates the override signal. Additional current sensing circuitry determines the duration of the override signal.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. For simplicity, a non-synchronous four-phase buck converter is used in the described embodiments. However, any switching buck converter, including synchronous converters, can utilize the principles of the claimed invention. The following detailed description is, therefore, not to be construed in a limiting sense, as the scope of the present invention is defined by the claims.

Figure 1:
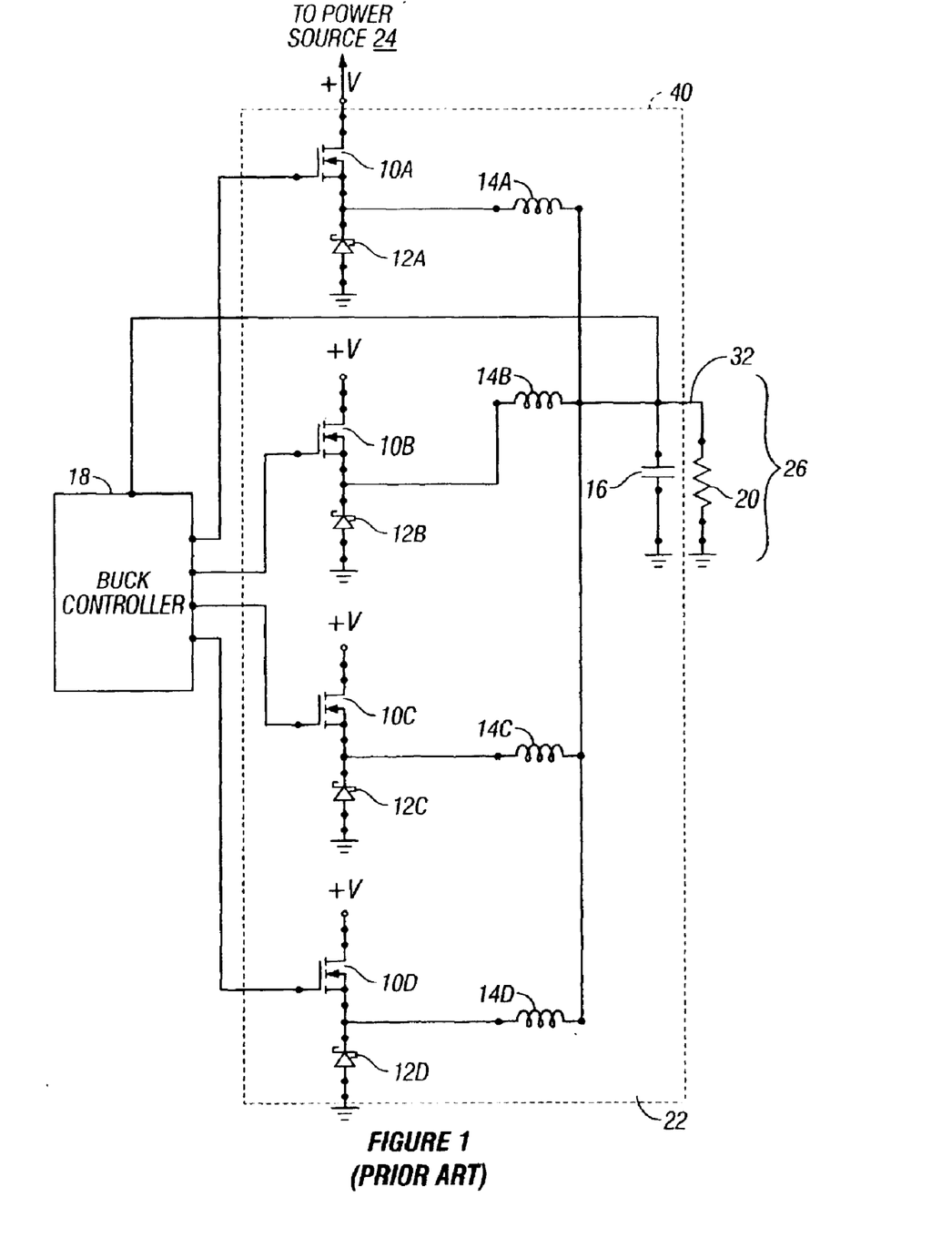
FIG. 1 is a circuit diagram of a four-phase non-synchronous buck converter of the prior art.

A typical four-phase buck converter of the prior art is depicted in FIG. 1. The buck converter 40 includes four inductors 14A, 14B, 14C, and 14D (collectively, inductors 14) placed in series with a load 20, a capacitor 16 across the load, and four diodes 12A, 12B, 12C, and 12D (collectively, diodes 12). The diodes 12A, 12B, 12C, and 12D are each coupled to a source of one of four MOSFETs 10A, 10B, 10C, and 10D (collectively, MOSFETs 10), respectively. The drain of each MOSFET 10 is coupled to a power source 24. The MOSFETs 10, diodes 12, inductors 14, and capacitor 16 collectively are known as the switch logic 22 of the buck converter 40.

The MOSFETs depicted are N-channel enhancement mode MOSFETs. Alternatively, the MOSFETs 10 may be replaced by insulated gate bipolar transistors (IGBTs), bipolar switches, or other types of switches. Each MOSFET 10 is associated with a phase of the buck controller output.

In addition to the switch logic 22, the buck converter 40 also includes a buck controller 18. The buck controller 18 is a pulse-width modulating controller for switching on and off the MOSFETs 10 of the switch logic 22. When one or more of the MOSFETs 10 are switched on, an increase in current is supplied to the load 20.

Figure 2:
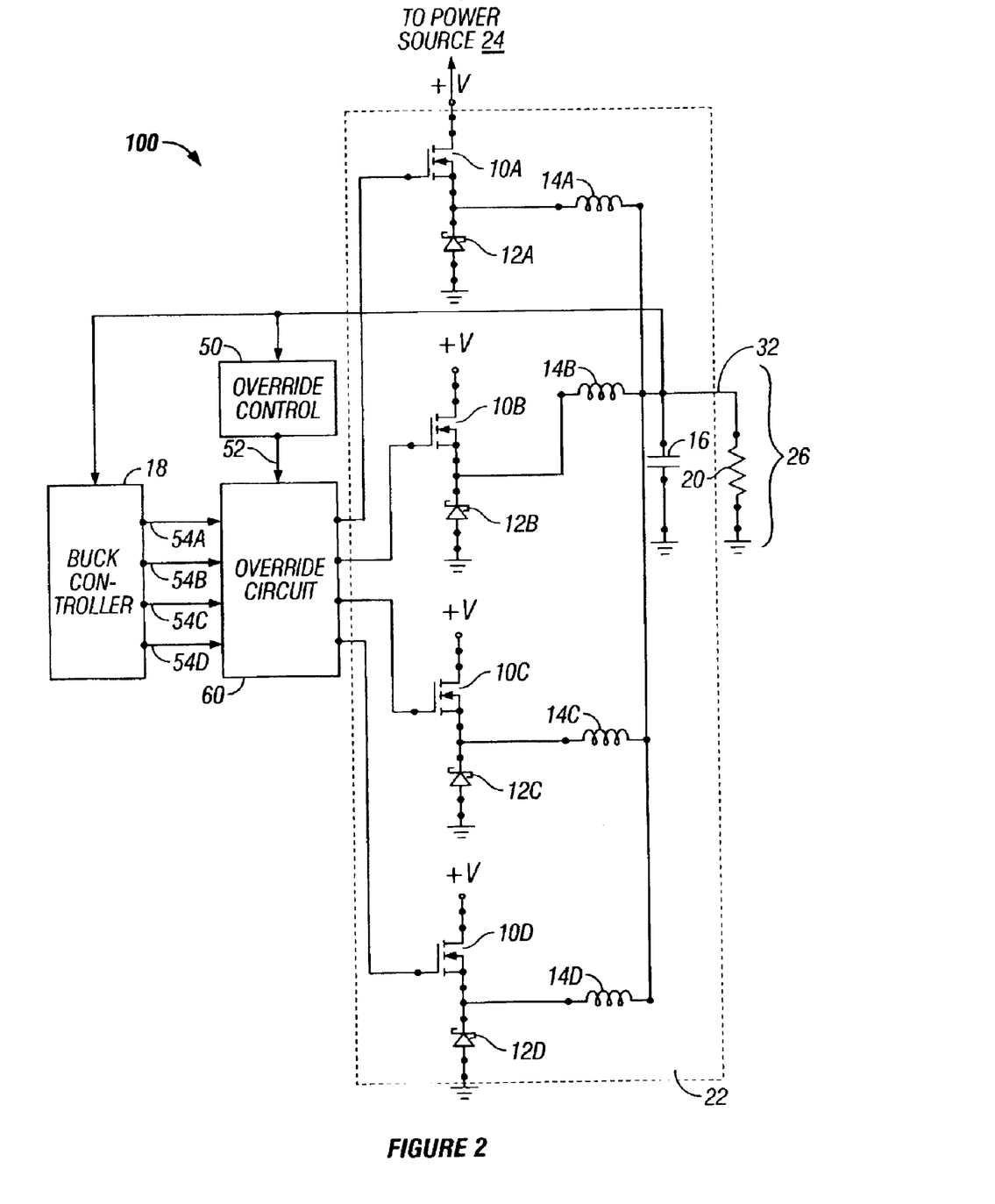
FIG. 2 is a circuit diagram of the buck converter according to some embodiments of the invention.

In contrast, FIG. 2 shows a second four-phase buck converter 100. In addition to having the circuitry shown in FIG. 1, the buck converter 100 includes an override control circuit 50 and an override circuit 60, coupled between the buck controller 18 and the switch logic 22. During standard operation, the override circuit 60 allows signal pulses 54A, 54B, 54C, and 54D (collectively, signal pulses 54) sent by the buck controller 18 to be received by the switch logic 22. Each signal pulse 54 turns on a MOSFET 10 as directed by the buck controller 18.

The override control circuit 50 generates either an override pulse 52 (one-shot pulse method) or an override signal 92 (continuous method) to be received by the override circuit 60. This "activation" of the override circuit 60 supplants the activation by the buck controller 18. Thus, while the buck controller 18 causes the switching MOSFETs 10 to selectively be turned on, the override control circuit 50 likewise selectively turns on the MOSFETs 10. In some embodiments, the activation of the override circuit 60 by the override control circuit 50 employs one of two methods, as described below.

One-Shot Pulse Method

Figure 3:
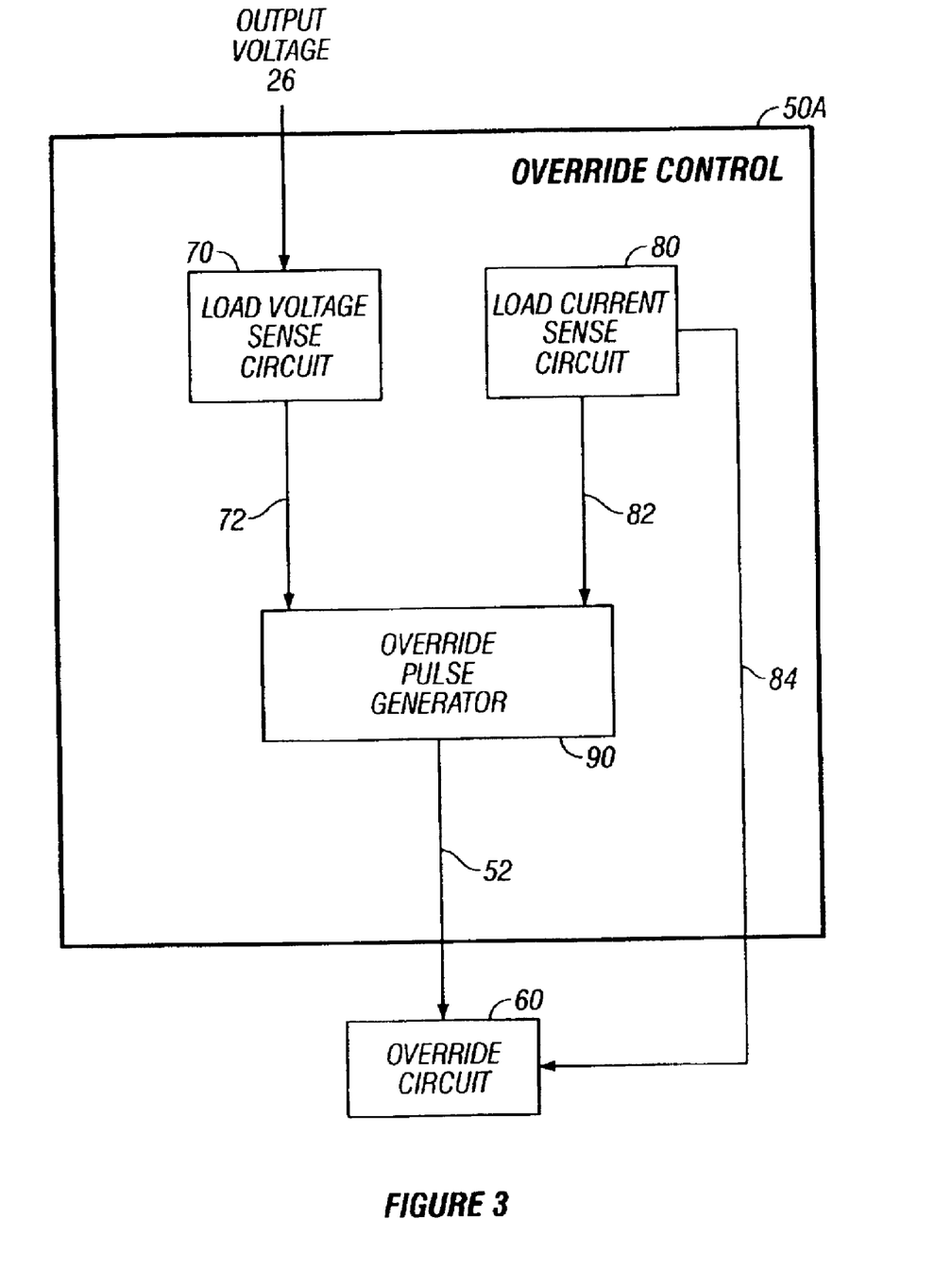
FIG. 3 is a block diagram of an override control circuit used by the buck converter of FIG. 2 according to some embodiments of the invention.

An override control circuit 50A that generates an override pulse of a fixed duration is depicted in the block diagram of FIG. 3. A voltage sense circuit 70 monitors the output voltage 26 to detect a step, or change, in the voltage. When a voltage step is detected, an override pulse ON signal 72 is generated. A load current sense circuit 80 produces a sensed current change signal 82, either by monitoring the output current 32 to measure a current step or by indirect means, such as by measuring the voltage over time.

An override pulse generator 90 receives both the override pulse ON signal 72 and the sensed current change signal 82, to produce an override pulse 52. The duration, or width, of the override pulse 52 is determined by the sensed current change signal 82. Further, a phase/switch selection signal 84 is generated by the load current sense circuit 80 and sent to the override circuit 60. The phase/switch selection signal 84 indicates which of the MOSFETs 10 are to be activated during transient correction of the buck converter 100. Put another way, the phase/switch selection signal 84 indicates which of the phases of the voltage 26 generated by the buck converter 100 are turned on. The override control circuit 50A thus produces a fixed duration one-shot override pulse 52, to activate one or more switches (MOSFETs 10) of the switch logic 22. For simplicity, the method employed by the override control circuit 50A of FIG. 3 is described herein as the one-shot pulse method.

Continuous Signal Method

Figure 4:
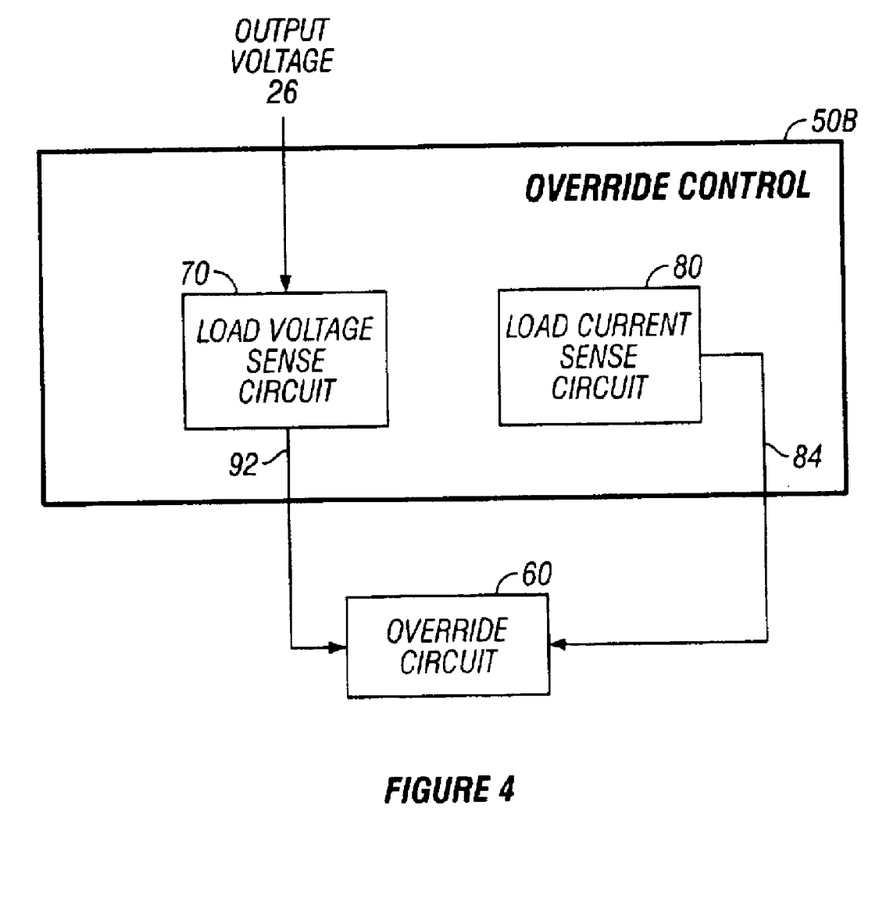
FIG. 4 is a block diagram of a second override control circuit used by the buck converter of FIG. 2 according to some embodiments of the invention.

In a second embodiment, as illustrated in the block diagram of FIG. 4, an override control circuit 50B also includes a voltage sense circuit 70 and a load current sense circuit 80. Based upon a voltage change detected by the voltage sense circuit 70, a continuous signal, known as override signal 92, is sent to the override circuit 60. Since the override signal 92 is a continuous signal, rather than a pulse, no pulse duration is determined. Instead, the load current sense circuit 80 generates the phase/switch selection signal 84, indicating to the override circuit 60 which MOSFETs 10 to turn on while the override signal 92 is active. The load current sense circuit 80 makes its determination by either directly monitoring the load current 32 or by indirectly deriving the current, such as by monitoring the slope of the output voltage 26, and may include the timing of the last signal turning on a phase/switch in making this determination. The method employed by the override control circuit 50B is described herein as the continuous signal method.

Using either the one-shot pulse or the continuous signal method, the buck converter 100 automatically performs transient suppression of the output voltage 26. Generally, a transient is a temporary change in voltage. The transient voltage can be in the form of an undershoot or an overshoot, in which the output voltage drops below or increases above, respectively, the steady voltage. Transients can occur when there is a step in the load. By carefully timing either the override pulse 52 or the override signal 92, the buck converter 100 automatically prevents a voltage drop below a predetermined voltage, known herein as a below minimum condition, from occurring.

Voltage Sense Circuit

Both the override control circuits 50A and 50B include a voltage sense circuit 70. The voltage sense circuit 70 generates one of two signals when a voltage change is detected. For the one-shot pulse method, the voltage sense circuit 70 generates an override pulse ON signal 72, to be received by the override pulse generator 90 (see FIG. 3). For the continuous signal method, the voltage sense circuit 70 generates the override signal 92 (see FIG. 4). By monitoring the output voltage 26, the voltage sensing circuit 70 prevents the output voltage 26 from dropping below a desired voltage.

Figure 5:
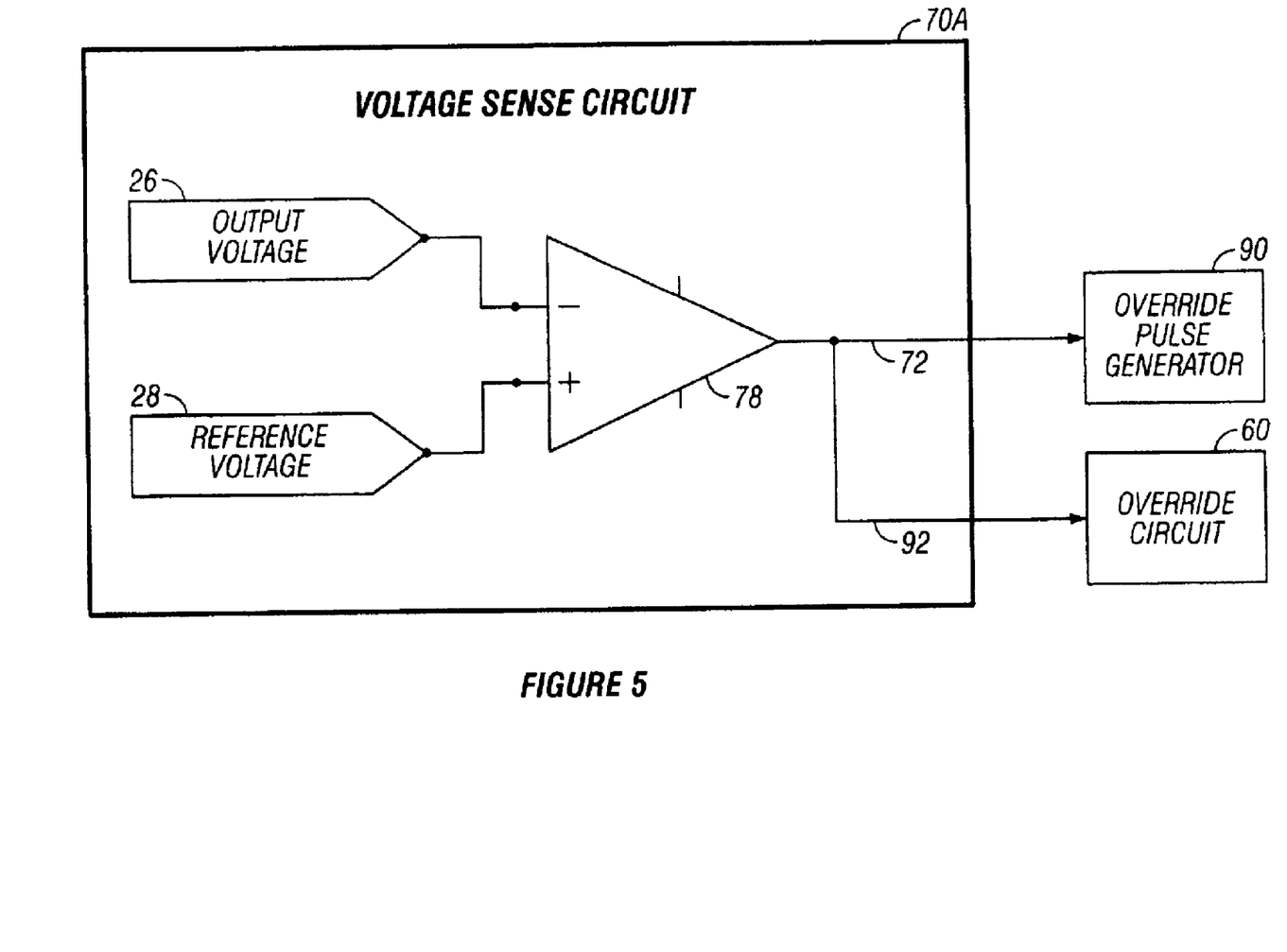
FIG. 5 is a block diagram of a voltage sense circuit used by the buck converter of FIG. 2 according to some embodiments of the invention.

The voltage sense circuit 70 may identify a voltage step in one of several ways familiar to those of ordinary skill in the art. In FIG. 5, for example, a block diagram of the voltage sensing circuit 70A illustrates one mechanism for detecting a voltage change. A comparator 78 senses the output voltage 26 of the buck converter 100. The output voltage 26 is compared to a reference voltage 28. The reference voltage 28 is a predetermined voltage. When the output voltage 26 drops below the reference voltage 28, a signal is generated. Instead of using a comparator, other means for identifying a voltage change may be employed.

In the override control circuit 50A (one-shot pulse method), the signal generated by the voltage sense circuit 70 is the override pulse ON signal 72. This signal 72 is sent to the override pulse generator 90, such that the override pulse 52 is received by the override circuit 60. The override pulse 52 causes one or more switching MOSFETs 10 to be turned on, and remain switched on for the duration of the pulse 52. The pulse duration as well as the number of MOSFETs to be activated is determined by the load current sense circuit 80. If the output voltage 26 remains below the reference voltage level 28, continual pulses of a shorter duration can be produced until the output voltage 26 rises above the reference voltage level.

In the override control circuit 50B (continuous signal method), the signal generated by the voltage sense circuit 70 is the override signal 92. The override signal 92 is sent to the override circuit 60, such that one or more switching MOSFETs 10 are turned on. The number of MOSFETs 10 to activate is determined by the load current sense circuit 80. The turned on MOSFETs remain turned on by override control 50 until the override signal 92 is deactivated.

Load Current Sense Circuit

Both the override control circuits 50A and 50B include a load current sense circuit 80 for sensing a change in the load current 32. The load current sense circuit 80 monitors the load current 32 of the buck controller 100 in both override circuits 50A and 50B. In the override control circuit 50A, a sensed current change signal 82 is provided to the override pulse generator 90, which determines the width of the override pulse 52, and which MOSFETs to be activated. In the override control circuit 50B, a phase/switch selection signal 84 is supplied to the override circuit 60, which determines the number of MOSFETS 10 to be activated.

As the name suggests, the load current sense circuit 80 detects a step, or change, in the load current 32. For example, the load current sense circuit 80 can use a current sense resistor, an inductor sensor, output voltage slope sensing, MOSFET voltage drop during the MOSFET turn-on cycle, or any other method to sense the load current 32.

The sensed change in current can also be used to determine which phases (MOSFETs) of the switch logic are to be activated, or turned on. When the below reference condition ends, the MOSFETs are returned to the standard operating state. Other factors can be used to determine which MOSFETs are activated, and the duration of the override pulse 52, when used, known herein as the switch history of the buck controller 100. Switch history factors can affect the value of the phase/switch selection signal 84. Further, although the phase/switch selection signal 84 identifies which MOSFETs are to be turned on, the override circuit 60 may actively turn the unselected MOSFETs off during transient suppression.

Where the one-shot pulse method is employed (override control 50A of FIG. 3), the duration of the override pulse 52 is programmable. The load current sense circuit 80 monitors the current drawn by the load (i.e., the load current 32) from the power source 24. The width of the override pulse 52 is derived, once a change in the load current 32 is sensed, using any applicable method. For example, a current sense resistor, an inductor sensor, droop slope sensing, voltage sensed across a MOSFET during the MOSFET's turn-on cycle, or other methods known to those of ordinary skill in the art, may be employed to sense the load current.

In one embodiment, the load current sense circuit 80 is a slope detector that monitors the output voltage 26. When the load 20 is switched onto the power source 24, the output voltage 26 drops with a slope that is proportional to the current change drawn by the load 20. Thus, by measuring the slope of the output voltage 26, the output current step can be determined. The voltage slope method of obtaining the step in output current can be advantageous, in some embodiments. For example, the buck converter 100 can be manufactured without power-consuming current sense resistors.

Figure 6:
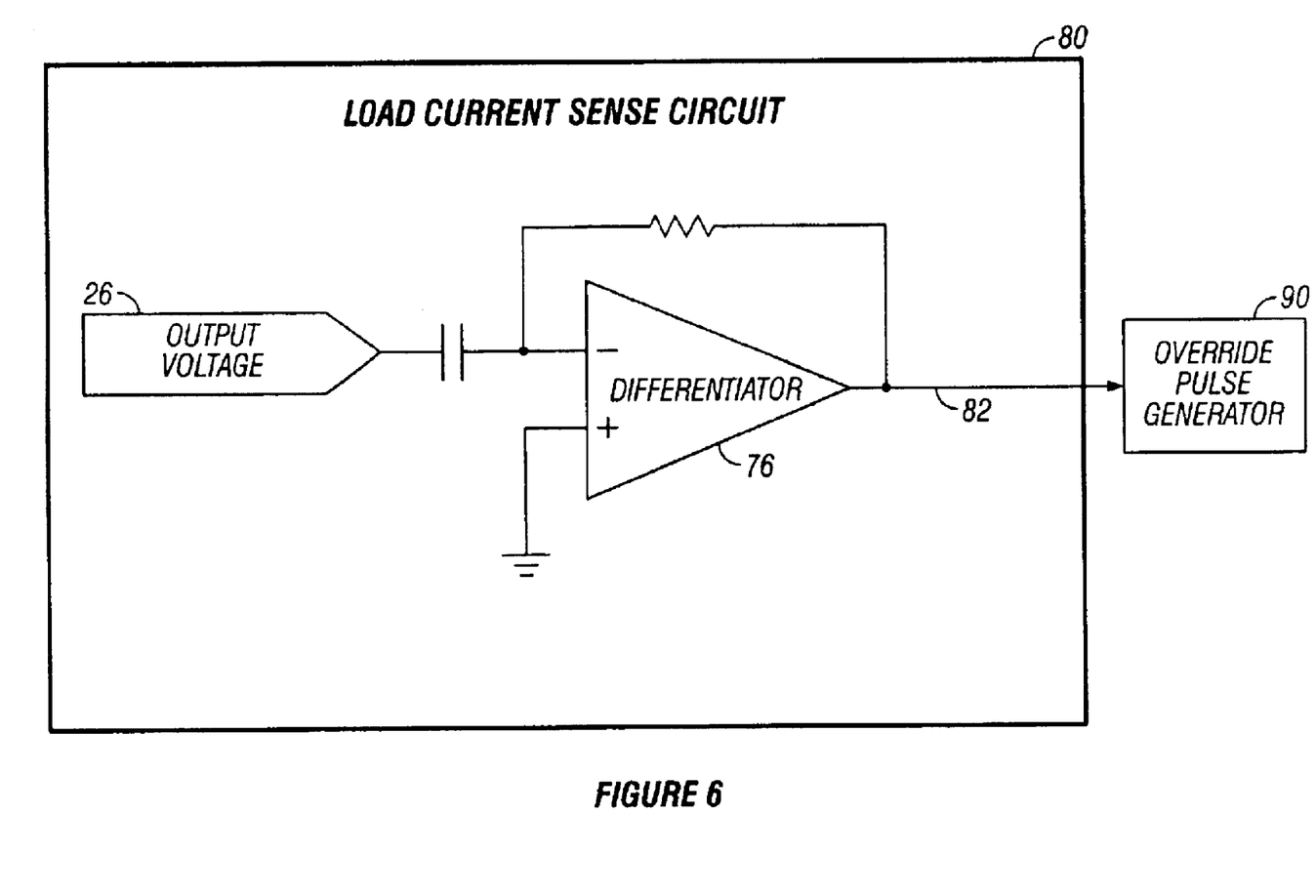
FIG. 6 is a block diagram of a load current sense circuit used by the buck converter of FIG. 2 according to some embodiments of the invention.

For example, in FIG. 6, the load current sense circuit 80 comprises a differentiator 76 that generates a voltage relative to the current change. This adjusts the duration of the override pulse 52 at a rate proportional to the rate at which the output voltage 26 (i.e., the input to the differentiator 76) is changing at the time the voltage sense circuit triggers. If the output voltage 26 is changing quickly, the override pulse ON signal 72 will be longer in duration than if the output voltage is changing slowly. The differentiator 76 monitors the constancy of the output voltage 26. The sensed current change signal 82 received by the override pulse generator 90 governs the width of the override pulse 52.

The load current sense circuit 80 may employ other methods for detecting the slope of the output voltage. For example, the slope of the output voltage 26 can be determined as a ratio of the time interval versus the voltage change. A predetermined voltage can trigger an RC (resistive capacitive) decay circuit, which will then be sampled at a lower trigger voltage. This sampled RC voltage can provide a voltage to determine the converter output voltage slope.

The slope detector method of voltage sensing controls the transient droop of the buck converter 100 without using power-consuming sense resistors. Because the slope detector determines the duration of the override pulses 52 from the slope of the voltage change, it provides a more readily implemented and economical means, as compared to other methods, for detecting sudden heavy loads, according to one embodiment.

When the continuous signal method (override control 50B of FIG. 4) is employed by the buck converter 100, the voltage sense circuit 70 may use a comparator that receives the output voltage 26 and the reference voltage 28 as inputs, just as in FIG. 5. However, instead of triggering a condition in which an override pulse 52 is generated, the override circuit 60 is activated by sending the override signal 92 from the comparator output. As long as the below reference condition exists, the override signal 92 will occur.

Figure 7:
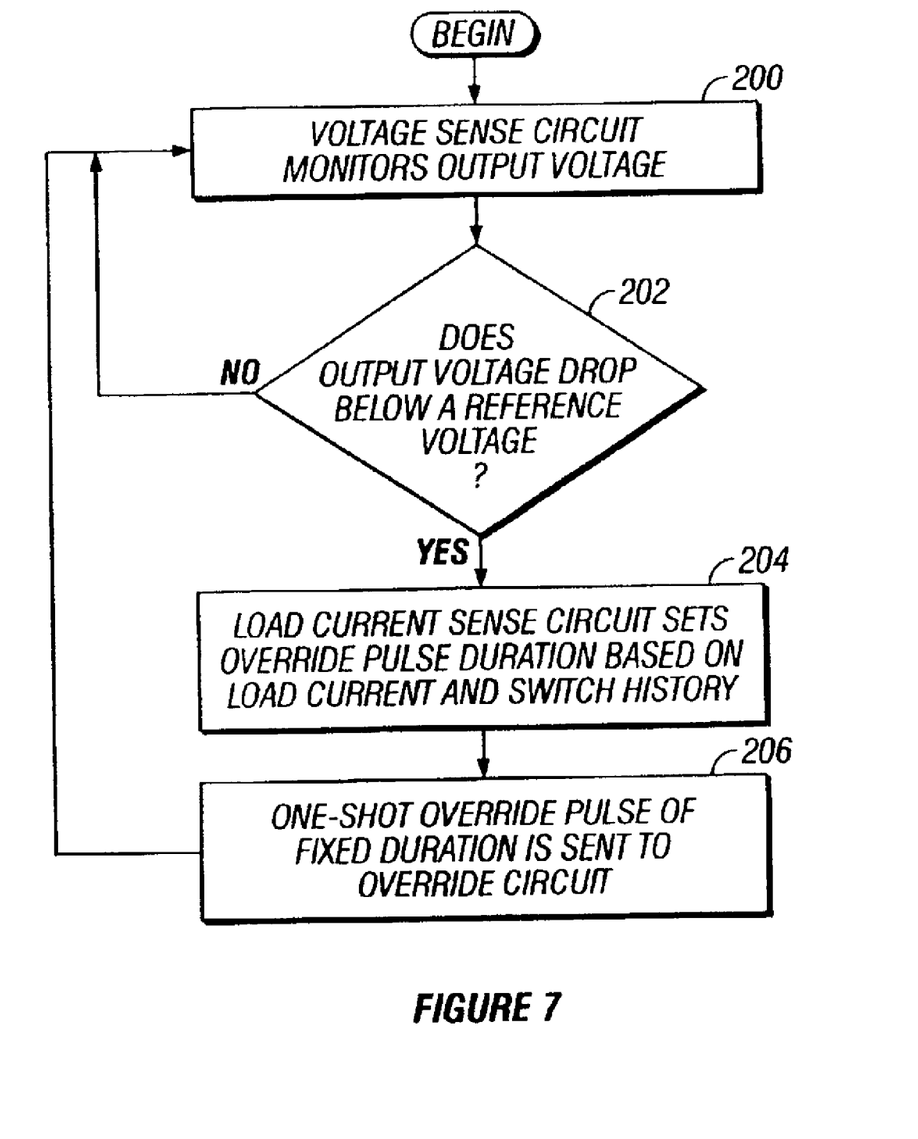
FIG. 7 is a flow diagram showing operation of the override control circuit of FIG. 3 according to some embodiments of the invention.
Figure 8:
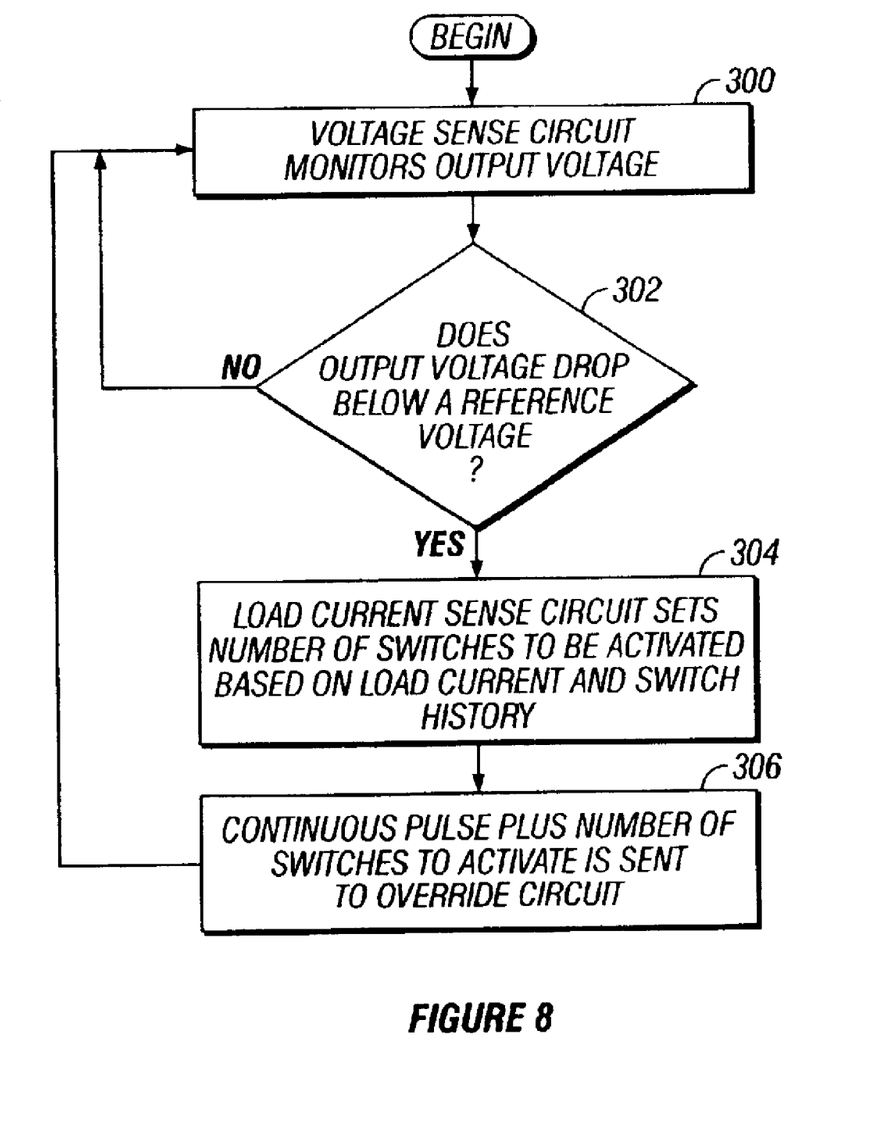
FIG. 8 is a flow diagram showing operation of the override control circuit of FIG. 4 according to some embodiments of the invention.

In FIG. 7, a flow diagram illustrates operation of the override control circuit 50A (the one-shot pulse method), according to one embodiment. Preferably, the operations of FIG. 7 can be performed continuously so that a below minimum condition can automatically be protected against. Accordingly, the voltage sense circuit 70 monitors the output voltage 26 (block 200). This process repeats until the voltage drops below the reference voltage (the below reference condition) (block 202), which causes the override pulse 52 to be generated. The load current sense circuit 80 sets the duration of the override pulse based on the load current 32 and the switch history (block 204), wherein the switch history encompasses the aforementioned switch operating conditions. Recall that the load current sense circuit 80 may make its determination by either measuring the load current 32 directly or by indirectly deriving the load current. A one-shot override pulse 52 of predetermined duration is sent to the override circuit 60.

in FIG. 8, a second flow diagram illustrates operation of the override control circuit 50B (the continuous signal method), according to one embodiment. The operations of FIG. 8 are preferably performed continuously so that a below minimum condition can automatically be protected against. The voltage sense circuit 70 monitors the output voltage 26 (block 300). When the output voltage drops below the reference voltage (block 302), the override signal 92 can be generated. The load current sense circuit 80 monitors the load current 32, and, based on a change in load current and the switch history, selects which of the MOSFETs 10 is activated (block 304). Accordingly, the override circuit 60 receives a continuous pulse (override signal 92) as well as the number of switches to be activated (block 306).

Figure 9:
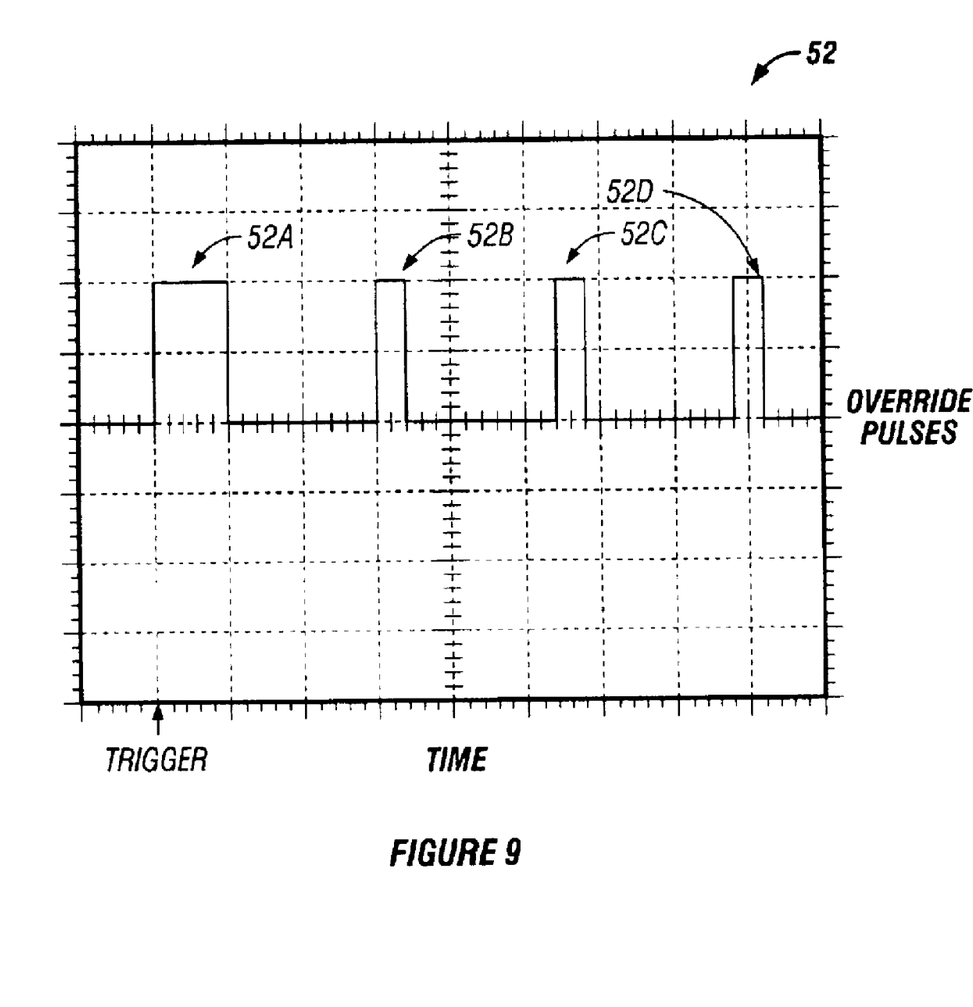
FIG. 9 is a sample waveform of the override pulse generated by the buck converter of FIG. 2 according to some embodiments of the invention.

A sample waveform of the override pulses 52A, 52B, 52C, and 52D (collectively, override pulses 52) used by the override circuit 50A (one-shot pulse method) is shown in FIG. 9. Following the first override pulse 52A, subsequent pulses 52B, 52C, 52D may be the same duration or shorter that the first override pulse 52A. In one embodiment, pulses succeeding the first override pulse (52B, 52C, 52D) are automatically shorter than the first override pulse 52A, to provide stability to the switch logic 22. For example, the second override pulse 52B may be automatically one-half the duration of the first override pulse 52A. In a second embodiment, the duration of each override pulse 52 is governed by the monitoring circuitry (i.e., the circuits 70 and 80). In one embodiment, the narrower pulses continue until the output voltage 26 is above the reference voltage 28.

Figure 10A:
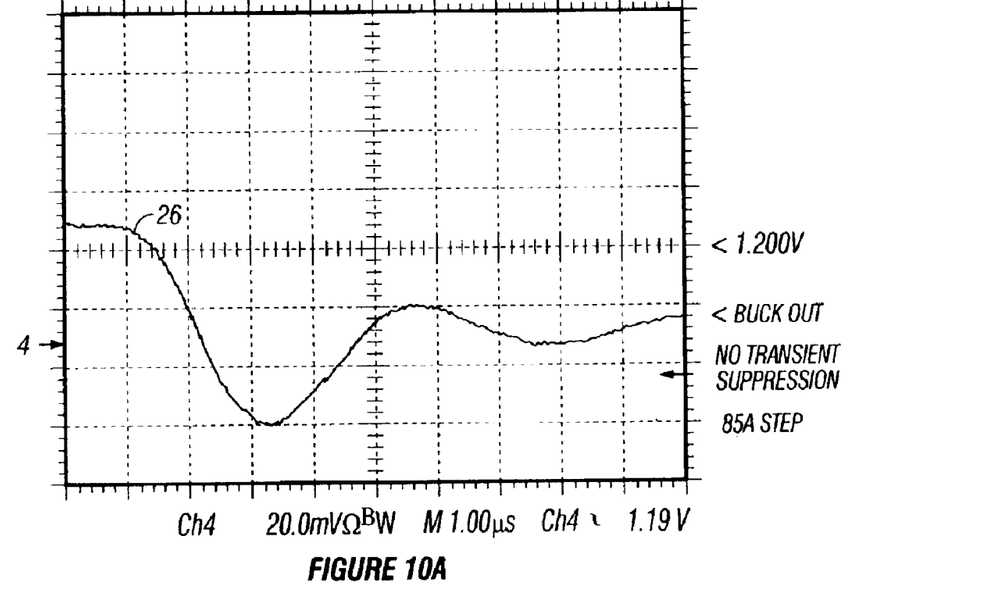
FIG. 10A is a waveform of the output voltage of the buck converter of FIG. 2 when an 85 A load is applied with no transient suppression according to some embodiments of the invention.

FIG. 10A is a waveform of the output voltage 26 when an 85 A load is connected to the buck converter 100. As the waveform illustrates, the output voltage 26 drops significantly when the 85 A load is applied. In contrast, the waveform of FIG. 10B, which also shows the output voltage 26 when an 85 A load is applied, shows less of a drop in voltage. This is because additional override pulses 52E and 52F, which are visible in the waveform, were sent to the switch logic 22 to mitigate the expected voltage drop at the load 20. Notice that the override pulse 52F is shorter in duration than the override pulse 52E.

Figure 11A:
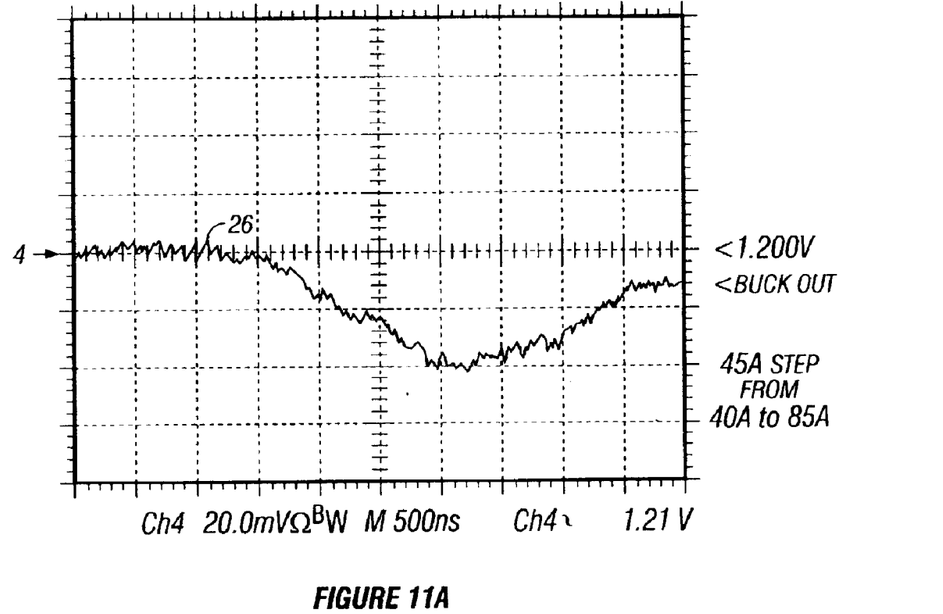
FIG. 11A is a waveform of the output voltage of the buck converter of FIG. 2 when a 45 A step in load is applied with no transient suppression according to some embodiments of the invention.

In FIG. 11A, a waveform of the output voltage 26 is shown when a 45-amp step in the load occurs, such as when the load current increases from 40 amps to 85 amps. As in FIG. 10A, a significant drop in the output voltage 26 can be observed. The same load change is observed in the waveform of FIG. 11B. This time, however, the buck converter 100 is able to respond to the change in the output voltage 26. The override pulse 52G is sent to the switch logic 22 once the output voltage 26 drops. Although not shown in FIG. 11B, additional narrower pulses may continue being transmitted by the override control circuit 50 until the output voltage 26 is above the reference voltage 28.

Figure 10B:
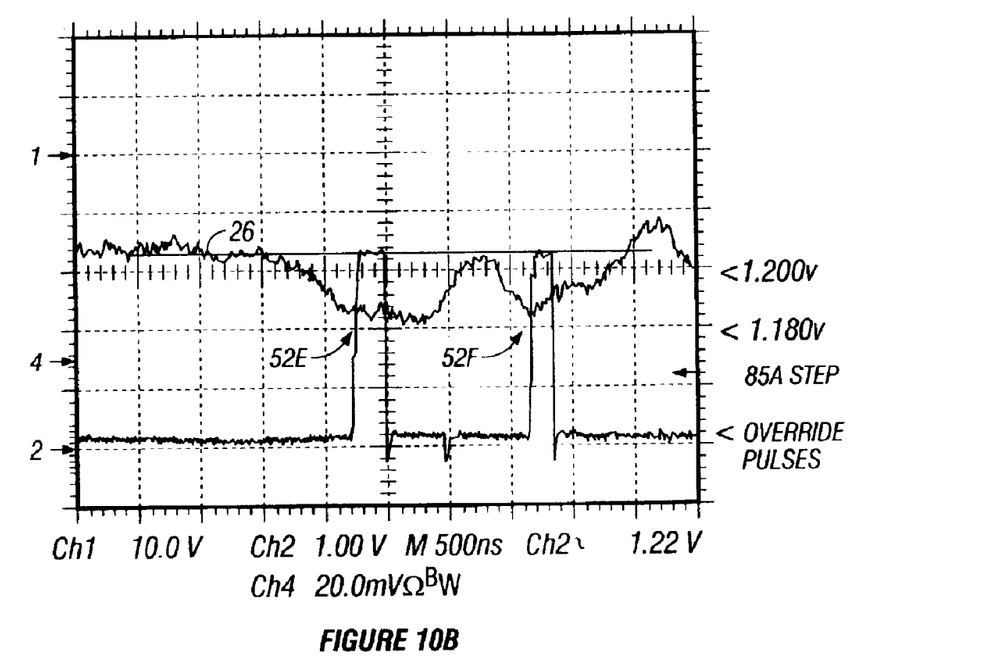
FIG. 10B is a waveform of the output voltage of the buck converter of FIG. 2 when an 85 A load is applied with transient suppression according to some embodiments of the invention.
Figure 11B:
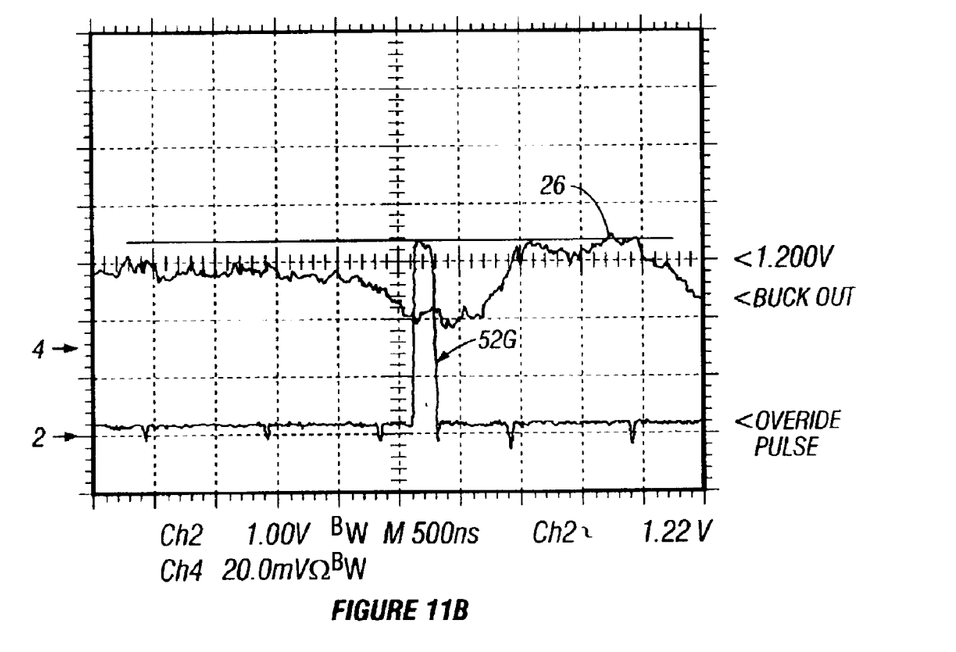
FIG. 11B is a waveform of the output voltage of the buck converter of FIG. 2 when a 45 A load is applied with transient suppression according to some embodiments of the invention.

The duration of the override pulse 52G in FIG. 11B is shorter than the first override pulse 52E in FIG. 10B. This is due to the reduced load step, from 85 amps in FIG. 10B to 45 amps in FIG. 11B.

The override control circuit 50 optimally sends override pulses 52 to the override circuit 60, causing the MOSFETs 10 to be turned on more often, or for a longer duration, such as when a load step change occurs. In this manner, the buck converter 100 controls the transient droop without using numerous costly capacitors. Further, the buck converter 100 provides extra protection against the output voltage 26 from dropping below the minimum condition.

The buck converter 100 can be implemented in virtually any environment in which buck converters can be used. By eliminating the costly and bulky capacitors, board space is saved, in one embodiment. The override control circuit 50 and override circuit 60 can readily be implemented in multi-phase DC/DC converters, eliminating the need for extra switching transistors.

While the invention has been described with respect to a limited number of embodiments, those skilled in the art will appreciate numerous modifications and variations therefrom. It is intended that the appended claims cover all such modifications and variations as fall within the true spirit and scope of the invention.

We claim:

1. A buck converter, comprising:
   a plurality of switches to receive a first current from a power source at a first voltage and supply a second current to a load at a second voltage;
   a controller comprising circuitry to selectively activate the plurality of switches during normal operation of the buck converter; and
   an override circuit comprising circuitry to selectively activate one or more of the plurality of switches when the second voltage drops below a reference voltage, the override circuit comprising:
      a first logic device for monitoring the second voltage, wherein the first logic device generates a first signal when the second voltage drops below the reference voltage; and
      a second logic device for monitoring the second current, wherein the second logic device identifies a number of switches to be activated, wherein the number is based on the second current.

2. The buck converter of claim 1, wherein the second logic device further identifies a time period in which the at least one of the plurality of switches remains activated.

3. The buck converter of claim 2, wherein the time period is based on the current supplied to the load.

4. The buck converter of claim 3, wherein the time period is also based on the switch history of the buck converter.

5. The buck converter of claim 1, wherein the number is also based on the switch history of the buck converter.

6. The buck converter of claim 1, wherein the first logic device comprises a comparator.

7. The buck converter of claim 1, wherein the second logic device comprises a differentiator.

8. The buck converter of claim 1, wherein the second logic device comprises a current sense resistor.

9. The buck converter of claim 1, wherein the second logic device comprises an inductor sensor.

10. The buck converter of claim 1, wherein the second logic device measures a change in voltage over time.

11. The buck converter of claim 1, wherein the controller selectively activates the switches when the second voltage increases above the reference voltage.

* * * * *